(12) United States Patent
Guglielmo et al.

(10) Patent No.: US 6,371,092 B1
(45) Date of Patent: Apr. 16, 2002

(54) FUEL SYSTEM WITH DUAL FUEL INJECTORS FOR INTERNAL COMBUSTION ENGINES

(75) Inventors: Kennon H. Guglielmo, San Antonio; Steven R. King, Boerne; Michael W. Walser, Comfort, all of TX (US)

(73) Assignee: Econtrols, Inc., San Antonio, TX (US)

( * ) Notice: Subject to any disclaimer, the term of this patent is extended or adjusted under 35 U.S.C. 154(b) by 0 days.

(21) Appl. No.: 09/758,072

(22) Filed: Jan. 10, 2001

(51) Int. Cl.$^7$ ............................................. F02D 41/14
(52) U.S. Cl. ...................... 123/527; 123/436; 123/435; 123/472
(58) Field of Search ................. 123/436, 435, 123/527, 472, 456, 300

(56) References Cited

U.S. PATENT DOCUMENTS

| | | | |
|---|---|---|---|
| 3,618,579 A | 11/1971 | Varran | 123/127 |
| 4,671,220 A | 6/1987 | Inoue et al. | 123/73 |
| 4,777,913 A | 10/1988 | Staerzl et al. | 123/73 |
| 5,003,952 A | 4/1991 | Weglarz et al. | 123/478 |
| 5,036,669 A | 8/1991 | Earleson et al. | 60/602 |
| 5,136,990 A | 8/1992 | Motoyama et al. | 123/73 |
| 5,284,117 A | 2/1994 | Akase | 123/445 |
| 5,345,911 A | 9/1994 | Kadowaki et al. | 123/436 |
| 5,467,593 A | 11/1995 | Vincent et al. | 60/274 |
| 5,549,083 A | * 8/1996 | Feuling | 123/525 |
| 5,666,923 A | 9/1997 | Collier, Jr. et al. | 123/488 |
| 5,775,282 A | 7/1998 | Smith | 123/179.8 |
| 5,803,057 A | * 9/1998 | Van de Brink | 123/527 |

* cited by examiner

Primary Examiner—Erick Solis
(74) Attorney, Agent, or Firm—Cox & Smith Incorporated

(57) ABSTRACT

This invention is directed to an apparatus and method for providing improved control of fuel, preferably gaseous fuel, to an internal combustion engine such that each cylinder of the engine will operate within a predetermined tolerance off of its lean misfire limit. The disclosed system introduces fuel to the engine at two locations: (1) upstream of the intake manifold to provide premixing of a majority of the fuel with air, and (2) near the intake valve of each cylinder for tailoring the fuel flow to each cylinder to achieve that fuel-to-air ratio which is necessary to maintain each cylinder at the desired tolerance from the lean misfire limit. Several calibration and control methods are described to maximize performance of the fuel system, including the use of a misfire detection technique to determine the lean misfire limit of each cylinder to allow the respective port fuel injector to provide a specified margin from lean misfire. The present invention enhances engine performance and driveability while reducing exhaust emissions.

21 Claims, 2 Drawing Sheets

FUEL SYSTEM WITH DUAL FUEL INJECTORS FOR INTERNAL COMBUSTION ENGINES

BACKGROUND OF THE INVENTION

1. Field of the Invention

This invention relates generally to fuel supply systems for engines, and more particularly to a method and apparatus for introducing fuel to an internal combustion engine both upstream and downstream of the intake manifold.

2. Description of the Related Art

While consumers continue to demand improved engine performance in terms of power, efficiency, reliability, and driveability, regulating bodies continue to impose stricter standards requiring further reductions in harmful exhaust emissions. As a result, engine development engineers must continually strive to develop new technologies that improve combustion performance while reducing exhaust emissions in order to meet market demands.

Gaseous fuels are becoming increasingly popular for use as engine fuels due to their inherently cleaner combustion, which provides the potential for lower regulated exhaust emissions. However, producing a reliable, efficient, cost-effective, heavy-duty, gaseous-fueled engine has proved to be a difficult task. Gaseous-fueled engines are typically spark-ignited, turbocharged, lean-burn engines derived from their dieseli counterparts, and the performance of such gaseous-fueled engines must mimic that of their diesel counterparts to ensure successful use in the intended applications. These lean-burn engines operate with lean fuel-air mixtures to achieve the optimal thermal efficiency (approaching that of a diesel engine) and to meet strict emissions standards (lower than that of a diesel engine). Such lean-burn engines typically operate very close to the lean flammability limit of the fuel-air mixture. For the purposes of this disclosure, the terms "lean flammability limit" and "lean misfire limit" are used interchangeably to denote the condition in which the fuel-air mixture contains just that amount of fuel which is necessary to sustain combustion and thereby prevent misfire.

To help quantify the lean flammability limit of a fuel-air mixture, a non-dimensional term known as "equivalence ratio" ($\phi$) is defined as the ratio of the actual fuel-air mass ratio to the stoichiometric fuel-air mass ratio. For example, a fuel-air mixture with an equivalence ratio of $\phi=0.5$ has 50% of the fuel of a stoichiometric mixture, regardless of the fuel type or composition. As noted above, lean-burn engines typically need to operate as close as possible to the lean flammability limit in order to achieve the desired engine performance and emissions levels. For instance, if the lean flammability limit of the fuel-air mixture is $\phi=0.62$ in a particular engine, the engine may need to operate at about $\phi=0.65$ to achieve the desired performance and emissions. If the engine operates slightly rich of the desired equivalence ratio, emissions will increase significantly and may result in non-compliance with applicable emissions regulations. On the other hand, if the engine operates slightly lean of the desired equivalence ratio, the engine may misfire, which adversely affects engine performance, driveability, and emissions. Thus, in a given engine, the equivalence ratio of the fuel-air mixture must fall within a certain range or "window" to provide acceptable engine operation. This equivalence ratio "window" can be very small and is dependent on many factors, as discussed below.

In a perfect world, all cylinders in an engine would have the same lean flammability limit and reach that limit at precisely the same time in operation. In the real world, however, this almost never occurs; instead, one cylinder will misfire before the others. Often, this one cylinder defines the lean operating limit for the whole engine. Likewise, on the rich side, one cylinder will almost always be richer than the others and produce higher emission levels than the others, thereby defining the rich operating limit for the whole engine. Therefore, the range of equivalence ratio that yields acceptable engine operation is smaller than if all cylinders reached their lean and rich limits at the same time.

Engine performance will improve, and the engine will produce lower emissions, if each cylinder operates at its optimum fuel-air mixture. This optimum mixture may be the same for each cylinder or it may vary among the cylinders, depending on the severity of the variation in the factors that affect combustion performance. Factors that cause variations in lean misfire limits among engine cylinders include: (1) fuel mal-distribution (fuel-air mixing on a macro scale); (2) fuel-air homogeneity (fuel-air mixing on a micro scale); (3) compression ratio; (4) volumetric efficiency (air mass in the cylinder); (5) cylinder wall temperature; (6) inlet mixture temperature; (7) coolant temperature; (8) residual exhaust fraction (left over combustion gas trapped in the cylinder); (9) in-cylinder air motion (swirl and tumble); and (lo) spark plug location and orientation. Those factors, along with basic fuel properties, define the lean flammability limit for each cylinder. The effects of the above factors may be minimized with careful design and development practices, but they cannot be eliminated.

Good homogeneity (mixing) is important for lean-burn combustion. Premix fuel systems, such as throttle-body injection (TBI) or carburetion systems, offer good fuel-air mixing, both on a macro and micro level. Good macro mixing provides good fuel mixture distribution to each cylinder. Good micro mixing provides good homogeneity of the mixture within each cylinder.

The mixing of fuel and air is a time-dependent phenomenon; the longer the mixing time, the more complete the mixing process. Premixing upstream of the intake manifold provides additional time compared to port injection systems. A premix fuel system offers the best control for factors (i) and (2) above, but it offers no control over factors (3) thru (10), which are cylinder-specific factors that require control of the fuel to each individual cylinder.

Multipoint fuel injection (MPI) offers control of fuel on an individual cylinder basis, which satisfies the control requirements for factors (3) through (10) above, but MPI has the disadvantages of higher fuel mal-distribution among cylinders due to injector flow variations, high sensitivity to those mal-distribution errors, reduced mixing time, and high fuel supply pressure. Historically, however, MPI systems have been used to control fuel on a macro level only (replacing the TBI); no successful attempt has been made to trim (tailor) the fuel flow on an individual cylinder basis. Thus, a need exists for a technique that will provide relevant feedback information from each cylinder to allow adjustment of the fuel injector for each respective cylinder.

Currently, no existing lean-burn fuel system provides the level of control required to simultaneously optimize engine performance, driveability, and emissions while maintaining a robust calibration. The existing engine calibration must, therefore, involve a compromise of the relevant parameters. The engine is usually calibrated richer than optimum to provide an acceptable margin from misfire and good driveability, but such a calibration results in higher than optimum NOx emissions. Current emissions regulations allow this type of compromise to exist, but lower emissions standards are in the process of being implemented, and soon such a rich calibration will not be an accepted practice.

In light of the foregoing problems, a method is needed whereby the effects of the aforementioned misfire factors can be controlled to the degree that they no longer impose unnecessary limitations on engine performance due to variations in the lean flammability limit among cylinders.

SUMMARY OF THE INVENTION

The fuel system of the present invention provides improved control of fuel delivery to an engine, preferably a gaseous-fueled engine, to enhance engine performance and driveability and simultaneously reduce exhaust emissions. The system disclosed herein introduces fuel, preferably gaseous fuel, to the engine at two locations: (1) upstream of the intake manifold (e.g., throttle body injection or carburetion) to provide premixing of a majority of the fuel with the air, and (2) near each intake valve (port injection) for trimming or tailoring the fuel flow to each cylinder based on the specific needs of the cylinder. Several calibration and control methods are described to maximize performance of the fuel system. Preferably, a misfire detection technique is used to determine the lean misfire limit of each cylinder, and a feedback control system allows the port fuel injectors to provide the appropriate "trim" amount of fuel to each cylinder such that each cylinder operates at a predetermined margin from its lean misfire limit. The present invention thereby optimizes engine performance and maximizes the range of equivalence ratio in which the engine may operate and still comply with strict emissions standards.

It is an object of the present invention to provide an improved fuel control system for internal combustion engines whereby the fuel-air mixture for each cylinder of the engine may be maintained at an optimum equivalence ratio.

It is a further object of the present invention to provide a fuel control system for internal combustion engines whereby the fuel-air mixture for each cylinder of the engine may be maintained at a specified margin from the lean misfire limit of each respective cylinder.

It is still another object of this invention to provide a fuel control system for internal combustion engines that maximizes engine performance while enabling conformance with strict emissions regulations.

It is yet another object of this invention to provide a gaseous fuel control system for internal combustion engines that may utilize conventional liquid fuel injectors for port injection of gaseous fuels due to the reduced quantity of fuel injected in the port.

It is yet another object of this invention to provide a fuel control system having reduced fueling errors compared to those of conventional multi-point injection systems.

It is still another object of this invention to provide a fuel control system with improved injector durability due to lower fuel flow rates and lower fuel supply pressures.

It is still another object of the present invention to provide a fuel control system that benefits from the better fuel-air mixing associated with throttle-body injection systems due to the increased mixture transport time and that also benefits from the cylinder-specific accuracy associated with port injectors.

Another object of the present invention is to provide a fuel control system with reduced closed-loop cycle times as compared to conventional premix fuel systems.

Still another object of this invention is to provide a fuel control system with reduced starting times as compared to conventional premix fuel systems.

Yet another object of this invention is to provide a fuel control system that is compatible with liquid fuel storage systems with low fuel supply pressures.

Further objects and advantages of the present invention will be readily apparent to those skilled in the art from the following detailed description taken in conjunction with the annexed sheets of drawings, which illustrate a preferred embodiment of the invention.

DETAILED DESCRIPTION OF A PREFERRED EMBODIMENT

Figure 1:
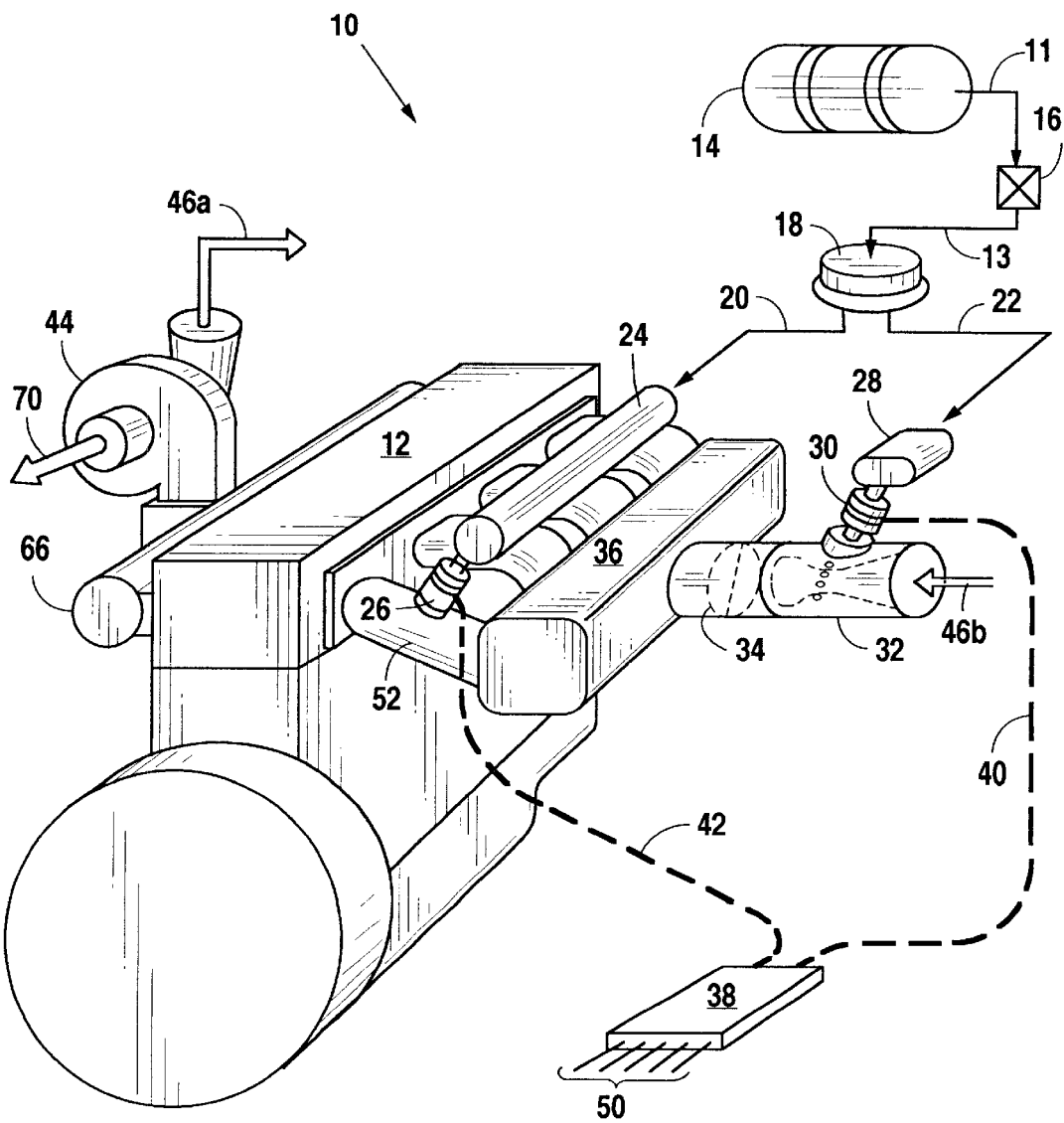
FIG. 1 is a schematic perspective view of a fuel system in accordance with the present invention.

FIG. 1 illustrates a preferred fuel system 10 in accordance with the present invention that is used to supply fuel, preferably gaseous fuel, to a multi-cylinder, turbocharged engine 12. With respect to the fuel in system 10, the term "fluid" is used herein to mean either a liquid or a gas. The fuel supply/storage of system 10 may be any of a number of commonly available fuel supply systems, such as stationary gas pipelines, compressed gas cylinders, or liquefied storage tanks. Preferably, fuel system 10 contains a fuel storage cylinder 14 that feeds fuel to the rest of system 10 through a fuel tube or supply line 11, which preferably includes an emergency shut-off valve 16 and may also include a fuel filter (not shown). Downstream of emergency shut-off valve 16, the fuel passes through fuel line 13 to a fuel pressure regulator 18, which regulates the pressure of the fuel according to methods well known in the art. From pressure regulator 18, the fuel is fed through supply lines 20 and 22 to MPI (multi-point injection) fuel rail 24 and TBI (throttle-body injection) fuel rail 28, respectively. Alternatively, MPI fuel rail 24 and TBI fuel rail 28 may be fed from separate fuel sources. Preferably, the fuel is supplied to both MPI fuel rail 24 and TBI fuel rail 28 at the same pressure, but a particular engine may require different pressures for MPI fuel rail 24 and TBI fuel rail 28.

Still referring to FIG. 1, TBI fuel rail 28 feeds primary fuel to TBI injector 30, which injects the majority of the required fuel into a fuel port on TBI fuel-air mixer 32 upstream of intake manifold 36 and throttle 34. TBI injector 30 is referred to herein as a primary fuel injector, which may be any suitable device for metering and introducing fuel to fuel-air mixer 32. Although FIG. 1 depicts only one TBI injector 30 adjacent fuel-air mixer 32, multiple TBI injectors 30 may be used, if necessary, and such TBI injectors 30 may be located separate from TBI fuel-air mixer 32 and connected to TBI fuel-air mixer 32 with a hose or other suitable conduit. Compressed air, which comes from turbocharger 44 as indicated at arrow 46a, enters TBI fuel-air mixer 32 at an air intake port as indicated at arrow 46b to be mixed with the primary fuel. TBI fuel-air mixer 32, which is installed at the inlet to intake manifold 36 of engine 12, is configured in a conventional manner to provide good mixing of the fuel and air before the primary fuel-air mixture enters intake manifold 36. Alternatively, a gas carburetor or air valve-type mixer of conventional design could be used in place of TBI fuel-air mixer 32 to meter and mix the fuel with the air, and any such device for mixing fuel and air is referred to herein as a fuel-air mixer. From TBI fuel-air mixer 32, the primary fuel-air mixture passes through throttle 34 and into intake manifold plenum 36, from whence it is channeled into individual intake runners 52 associated with each cylinder (not shown) of engine 12. At each intake runner 52, MPI fuel rail 24 feeds fuel to an MPI injector 26 near each cylinder of engine 12, and each MPI injector 26 injects secondary or "trim" fuel into the primary fuel-air mixture to produce a final fuel-air mixture that is tailored for each respective cylinder of engine 12. MPI injectors 26, which are referred to herein as secondary fuel injectors, may be any suitable device for metering and introducing additional fuel into the primary fuel-air mixture. For the sake of clarity, only one MPI injector 26 is shown. After combustion in the several cylinders, the exhaust gases are discharged through exhaust manifold 66 and turbocharger 44 as indicated at arrow 70. Preferably, an electronic control module (ECM) 38 is used to control TBI injector 30 and MPI injectors 26. ECM 38 is connected to TBI injector 30 by electrical line 40 and to MPI injectors 26 by electrical lines 42 (only one line 42 is shown for the sake of clarity). ECM 38 preferably includes a microcontroller, software with the appropriate control algorithms, engine-specific calibration maps, and a variety of inputs 50 from various sensors (not shown) for monitoring engine parameters, fuel system parameters, and engine operator (i.e., driver) commands according to methods well known in the art.

Figure 2:
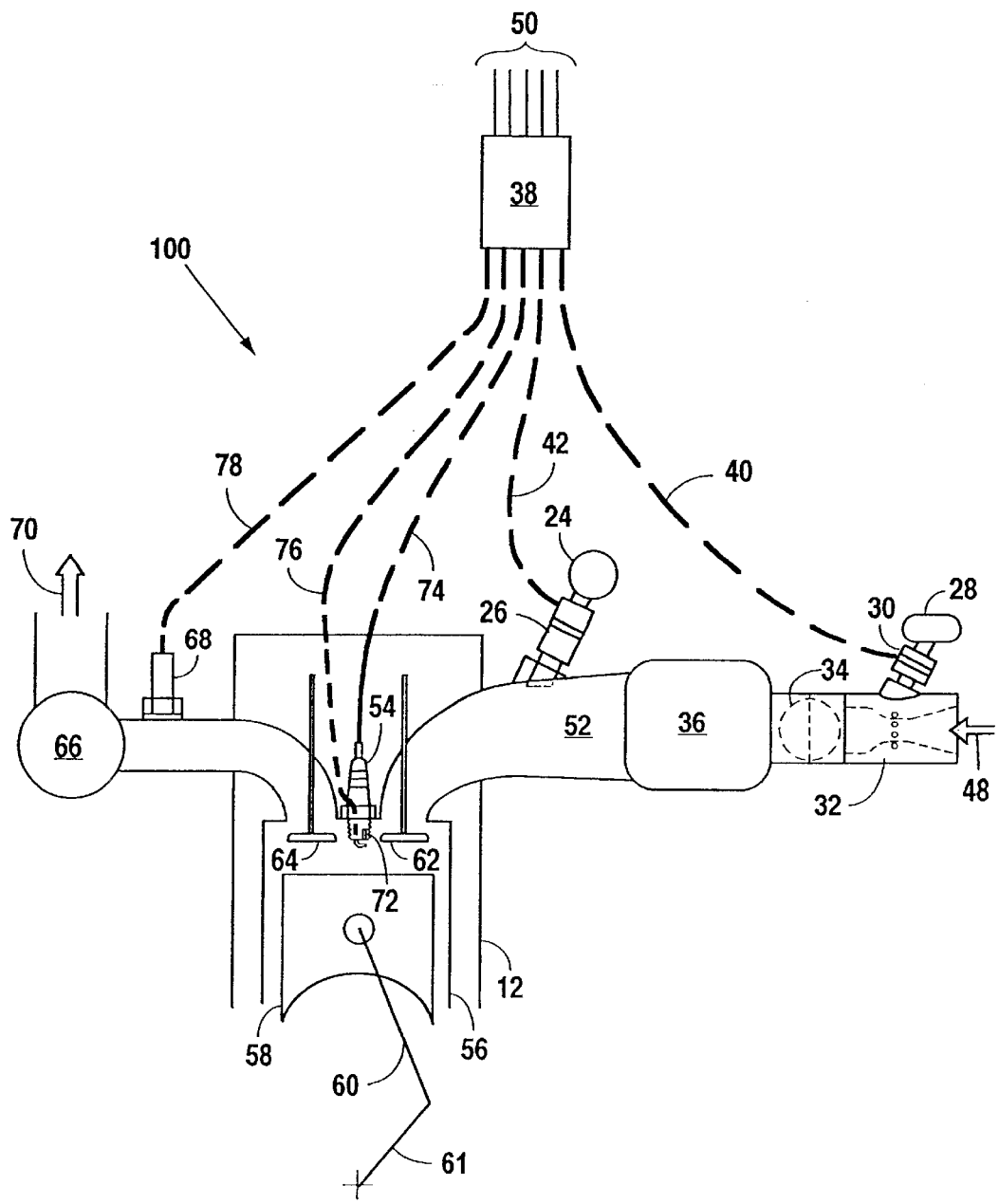
FIG. 2 is a schematic side elevation view of an alternative fuel system in accordance with the present invention.

FIG. 2 illustrates an alternative fuel system 100 as used in connection with a naturally aspirated engine 12 without a turbocharger. Except for the absence of a turbocharger, fuel system 100 contains the elements discussed above in connection with fuel system 10 of FIG. 1, but fuel storage cylinder 14, supply line 11, emergency shut-off valve 16, fuel line 13, pressure regulator 18, and supply lines 20 and 22 are not shown in FIG. 2 for the sake of simplicity. Also, as discussed further below, fuel system 100 has the additional capability of closed loop fuel control. In the absence of a turbocharger, air enters fuel-air mixer 32 as indicated at arrow 48, and the exhaust gases exit exhaust manifold 66 as indicated at arrow 70. FIG. 2 also depicts a sample cylinder 56 of engine 12 and the associated intake valve 62, spark plug 54 and high tension lead wire 74, exhaust valve 64, piston 58, connecting rod 60, and crankshaft 61.

As mentioned above, TBI injector 30 supplies a majority of the fuel required for engine operation. Fuel delivery from TBI injector 30 and TBI fuel-air mixer 32 is preferably based on conventional fuel control strategies, such as speed-density or mass air flow, which customarily determine the appropriate total amount of fuel for the complete engine. However, according to the present invention, ECM 38 is calibrated to provide some amount of fuel less than the total fuel requirement through TBI injector 30, preferably about 75–95% of the total required fuel. The specific percentage of total fuel supplied through TBI injector 30 is dependent on the variation in lean misfire limit of the several cylinders 56 over the operating range of engine 12. The primary fuel-air mixture produced by TBI fuel-air mixer 32 should be at least as lean as that required by the leanest cylinder to allow richening the mixture for the remaining cylinders. It is envisioned that TBI injector 30 should supply about 90–95% of the total required fuel for most engines.

To complete the total fuel requirement, MPI injectors 26 supply an appropriate amount of secondary fuel at each port or intake manifold runner 52 to meet the specific total fuel requirement for each individual cylinder 56. ECM 38 may determine the precise amount of fuel required by each cylinder 56 using one of several known methods, or a combination thereof. The simplest method is to provide an open-loop calibration for the MPI system that accounts for known and predictable cylinder-to-cylinder mixture variations, such as those resulting from mixing anomalies of the TBI system, volumetric efficiency differences, or residual fraction variations. However, such an open-loop system as shown in FIG. 1 may not be sufficient because it cannot account for injector-to-injector fuel flow variations.

More preferably, as illustrated in FIG. 2, an exhaust oxygen sensor 68, which is connected to ECM 38 by electrical line 78, may be used to provide real-time feedback of the fuel-air mixture strength from each cylinder 56 to allow ECM 38 to perform closed-loop fuel control of MPI injectors 26. This closed-loop system preferably employs a UEGO (universal exhaust gas oxygen) sensor that can sense lean fuel-air mixtures. The success of using oxygen sensor feedback depends heavily on the exhaust manifold and exhaust system design of the particular engine. A common log exhaust manifold may mix the exhaust streams from each cylinder to such an extent that the UEGO sensor simply measures an average exhaust mixture strength at the exhaust manifold outlet. In that event, it may be necessary to use more than one oxygen sensor 68 or an exhaust manifold 66 that has individual exhaust header tubes to allow the mixture strength from each cylinder 56 to be differentiated from the others, especially if used on a turbocharged engine. By accounting for transport delay times and sensor response in the control algorithms of ECM 38, it is possible to determine the mixture strength for a particular cylinder 56. That information is then used to trim, or tailor, the secondary fuel for that particular cylinder 56 to yield the desired fuel-air mixture. Each cylinder 56 may have a different optimum mixture for best overall engine performance. Further, by implementing adaptive fuel control in conjunction with closed-loop fuel control, the performance of TBI injector 30 and MPI injectors 26 may be continuously optimized.

Still referring to FIG. 2, an alternative preferred method for individual cylinder closed-loop fuel control involves the use of a misfire detection sensor 72 to provide feedback information to ECM 38 through electrical line 76, which controls MPI injectors 26 so as to adjust the amount of secondary fuel in order to provide a specified margin from the lean misfire limit for each cylinder 56. This technique is performed on a real-time basis during engine operation and accounts for all cylinder-specific operating variables (factors 3–10 above). When this technique is used in conjunction with adaptive fuel control, ECM 38 may effectively learn and adjust for the specific fuel requirement of each individual cylinder 56. Closed-loop and adaptive control techniques are commonly known to those skilled in the art of engine control. Any misfire detection strategy that provides cylinder-by-cylinder misfire detection may be used for closed-loop control of MPI injectors 26. A preferred misfire detection sensor 72 is a spark plug ionization sensor. Other misfire detection sensors 72 may include, but are not limited to, ICAV (instantaneous crank-angle velocity) sensors, in-cylinder pressure sensors, in-cylinder temperature sensors, piezoelectric sensors, and fiber-optic sensors. The timing of the fuel injection by MPI injectors 26 relative to the crankshaft position is based on specific engine performance requirements and may vary from engine to engine. By enabling the operation of each cylinder of the engine at a specified margin from its lean misfire limit, the hybrid fuel system 100 described herein provides a robust engine calibration that is optimized for emissions and performance. Stated another way, fuel system 100 will produce the lowest possible emissions while maintaining a robust, good performing engine under a variety of operating conditions.

One of the advantages of a hybrid or dual fuel system as described herein is a significant reduction in the large fueling errors associated with conventional MPI systems in which MPI injectors supply 100% of the fuel to the engine. MPI injectors typically have a fuel flow tolerance of about ±5% when new. When that fuel flow tolerance is added to the air flow variation between cylinders, which is typically about ±8%, the resulting total fueling error is typically about ±13% if the MPI system provides ±100% of the fuel. By contrast, if the TBI system provides, for example, 95% of the total fuel requirement of the engine in accordance with the present invention, then the error associated with the MPI injectors is reduced by a factor of 20 to only ±0.65%.

Another advantage of a hybrid fuel system in accordance with the present invention is its ability to use conventional liquid MPI injectors instead of special gaseous-fuel injectors. The density of liquid fuels (e.g., gasoline) is up to 1000 times that of natural gas at standard conditions. Existing gaseous-fuel systems generally use special gaseous injectors that have very large flow orifices, operate at high fuel supply pressures (up to about 175 psi), and use up to twelve injectors on a 6-cylinder engine to produce sufficient fuel flow to operate the engine. As a result, gaseous-fuel injectors suffer from premature wear and are usually short lived compared to conventional liquid-fuel injectors. High supply pressures also exacerbate injector opening variation, which further adds to the injector flow errors. The hybrid fuel system disclosed herein essentially eliminates those problems by reducing the flow requirement of the port injectors, thus allowing more conventional orifice sizing and reduced fuel supply pressure. Additionally, injector cost is reduced and system durability is improved.

Further, a hybrid fuel system as disclosed herein is compatible with low pressure fuel systems (<40 psi). Liquid storage of gaseous fuels (LNG, LPG) is becoming increasingly popular due to the increased energy density that such fuels offer. For vehicles, the increased energy density equates to a longer driving range, which is very important to the heavy-duty vehicle market. The fuel pressure of these liquid storage methods is significantly lower than compressed systems, sometimes as low as 40 psi. The compatibility with low pressure fuel systems makes the present system quite versatile, particularly for heavy-duty vehicles.

Finally, the MPI feature of the present invention provides more rapid closed-loop response and quicker starting times than conventional premix fuel systems due to reduced transport time from the point of injection to the combustion cylinder.

One of the primary intended applications of the present invention is in motor vehicles. However, persons reasonably skilled in the art will recognize that this invention may be applied to virtually any internal combustion engine. For example, this invention may be used to advantage in stationary generators, compressors, and other engine-operated equipment.

Although the foregoing specific details describe a preferred embodiment of this invention, persons reasonably skilled in the art will recognize that various changes may be made in the details of the method and apparatus of this invention without departing from the spirit and scope of the invention as defined in the appended claims. Therefore, it should be understood that this invention is not to be limited to the specific details shown and described herein.

We claim:

1. An apparatus for controlling the delivery of fuel to an internal combustion engine, said engine having an intake manifold for receiving a fuel-air mixture and a plurality of cylinders for facilitating combustion of said fuel-air mixture, said apparatus comprising:
    at least one fuel supply for storing and dispensing fuel;
    at least one primary fuel injector in fluid flow communication with said at least one fuel supply;
    a fuel-air mixer in fluid flow communication with said at least one primary fuel injector and said intake manifold, said fuel-air mixer being located upstream of said intake manifold, said fuel-air mixer having an air intake port for receiving air and a fuel port for receiving a primary amount of said fuel from said at least one primary fuel injector, said primary amount of said fuel being a majority of the total fuel required for combustion in said plurality of cylinders, said air and said primary amount of said fuel forming a primary fuel-air mixture; and
    a plurality of secondary fuel injectors respectively located adjacent each of said plurality of cylinders, said plurality of secondary fuel injectors being in liquid flow communication with said at least one fuel supply and said fuel-air mixer, each of said plurality of secondary fuel injectors being adapted for injecting a secondary amount of said fuel to be mixed with said primary fuel-air mixture, said secondary amount of said fuel being tailored for each respective one of said plurality of cylinders such that each of said plurality of cylinders receives an appropriate amount of fuel required for combustion.

2. The apparatus of claim 1 wherein said fuel-air mixer comprises a throttle-body injection system.

3. The apparatus of claim 1 wherein said fuel-air mixer comprises a carburetor system.

4. The apparatus of claim 1 wherein said fuel is in a gaseous state at said at least one primary fuel injector.

5. The apparatus of claim 1 wherein said fuel is in a gaseous state at said plurality of secondary fuel injectors.

6. The apparatus of claim 5 wherein said plurality of secondary fuel injectors comprises a plurality of conventional liquid fuel injectors.

7. The apparatus of claim 1 wherein said primary amount of said fuel comprises about 75 to 95 percent of the total fuel required for combustion in said plurality of cylinders.

8. The apparatus of claim 1 wherein each of said plurality of cylinders has a lean misfire limit and wherein, for each of said plurality of cylinders, said secondary amount of said fuel is calibrated to produce a fuel-air mixture having a specified margin from the lean misfire limit of each respective one of said plurality of cylinders.

9. The apparatus of claim 1 further comprising an electronic control module electrically connected to said at least one primary fuel injector and said plurality of secondary fuel injectors for controlling said primary and secondary amounts of said fuel.

10. The apparatus of claim 9 further comprising at least one exhaust oxygen sensor connected to said electronic control module for producing a signal representative of the oxygen content of the exhaust from said engine, wherein said electronic control module is capable of adjusting said secondary amount of said fuel in response to said signal.

11. The apparatus of claim 9 wherein each of said plurality of cylinders has a lean misfire limit, said apparatus further comprising a plurality of misfire detection sensors respectively provided for each of said plurality of cylinders, each of said plurality of misfire detection sensors being connected to said electronic control module and being capable of producing a signal representative of the lean misfire limit of each respective one of said plurality of cylinders, wherein said electronic control module is capable of adjusting said secondary amount of said fuel in response to said signal for each of said plurality of cylinders.

12. The apparatus of claim 11 wherein said plurality of misfire detection sensors is selected from the group consisting of spark-plug ionization sensors, instantaneous crank-angle velocity sensors, in-cylinder pressure sensors, in-cylinder temperature sensors, piezoelectric sensors, and fiber-optic sensors.

13. An apparatus for controlling the delivery of gaseous fuel to an internal combustion engine, said engine having an intake manifold for receiving a fuel-air mixture and a plurality of cylinders for facilitating combustion of said fuel-air mixture, each of said plurality of cylinders having a lean misfire limit, said apparatus comprising:

at least one fuel supply for storing and dispensing gaseous fuel;

at least one primary fuel injector in fluid flow communication with said at least one fuel supply;

a fuel-air mixer in fluid flow communication with said at least one primary fuel injector and said intake manifold, said fuel-air mixer being located upstream of said intake manifold, said fuel-air mixer having an air intake port for receiving air and a fuel port for receiving a primary amount of said fuel from said at least one primary fuel injector, said primary amount of said fuel being a majority of the total fuel required for combustion in said plurality of cylinders, said air and said primary amount of said fuel forming a primary fuel-air mixture;

a plurality of secondary fuel injectors respectively located adjacent each of said plurality of cylinders, said plurality of secondary fuel injectors being in liquid flow communication with said at least one fuel supply and said fuel-air mixer, each of said plurality of secondary fuel injectors being adapted for injecting a secondary amount of said fuel to be mixed with said primary fuel-air mixture and ingested into each respective one of said plurality of cylinders;

a plurality of misfire detection sensors respectively provided for each of said plurality of cylinders, each of said plurality of misfire detection sensors being capable of producing a signal representative of the lean misfire limit of each respective one of said plurality of cylinders, said plurality of misfire detection sensors being selected from the group consisting of spark-plug ionization sensors, instantaneous crank-angle velocity sensors, in-cylinder pressure sensors, in-cylinder temperature sensors, piezoelectric sensors, and fiber-optic sensors; and an electronic control module electrically connected to said at least one primary fuel injector, said plurality of secondary fuel injectors, and said plurality of misfire detection sensors for controlling said primary and secondary amounts of said fuel;

wherein said electronic control module is capable of adjusting said secondary amount of said fuel in response to said signal for each of said plurality of cylinders such that each of said plurality of cylinders receives a fuel-air mixture having a specified margin from the lean misfire limit of each respective one of said plurality of cylinders.

14. A method of controlling the delivery of fuel to an internal combustion engine from at least one fuel supply; said engine having an intake manifold for receiving a fuel-air mixture and a plurality of cylinders for facilitating combustion of said fuel-air mixture; said method comprising the following steps:

(a) distributing fuel from said at least one fuel supply to at least one primary fuel injector located upstream from said intake manifold;

(b) injecting a primary amount of said fuel from said at least one primary fuel injector into a fuel-air mixer, said primary amount of said fuel being a majority of the total fuel required for combustion in said plurality of cylinders;

(c) mixing said primary amount of said fuel with air in said fuel-air mixer to form a primary fuel-air mixture;

(d) distributing fuel from said at least one fuel supply to a plurality of secondary fuel injectors respectively located adjacent said plurality of cylinders;

(e) injecting a secondary amount of said fuel from each of said plurality of secondary fuel injectors into said primary fuel-air mixture to form a final fuel-air mixture for each of said plurality of cylinders, said secondary amount of said fuel being tailored for each respective one of said plurality of cylinders such that the final fuel-air mixture for each of said plurality of cylinders is appropriate for combustion; and (f) respectively passing said final fuel-air mixture to each of said plurality of cylinders.

15. The method of claim 14 wherein said fuel is in a gaseous state at said at least one primary fuel injector.

16. The method of claim 14 wherein said fuel is in a gaseous state at said plurality of secondary fuel injectors.

17. The method of claim 14 wherein said primary amount of said fuel comprises about 75 to 95 percent of the total fuel required for combustion in said plurality of cylinders.

18. The method of claim 14 wherein each of said plurality of cylinders has a lean misfire limit and wherein, for each of said plurality of cylinders, said step (e) comprises calibrating said secondary amount of said fuel such that said final fuel-air mixture has a specified margin from the lean misfire limit of each respective one of said plurality of cylinders.

19. The method of claim 14 further comprising the steps of:

(g) monitoring the oxygen content of the exhaust from said engine; and (h) adjusting said secondary amount of said fuel based on said oxygen content.

20. The method of claim 14 further comprising the steps of:

(g) detecting the lean misfire limit for each of said plurality of cylinders; and (h) adjusting said secondary amount of said fuel based on the respective lean misfire limit for each of said plurality of cylinders.

21. A method of controlling the delivery of gaseous fuel to an internal combustion engine from at least one fuel supply; said engine having an intake manifold for receiving a fuel-air mixture and a plurality of cylinders for facilitating combustion of said fuel-air mixture, each of said plurality of cylinders having a lean misfire limit; said method comprising the following steps:

(a) distributing gaseous fuel from said at least one fuel supply to at least one primary fuel injector located upstream from said intake manifold;

(b) injecting a primary amount of said fuel from said at least one primary fuel injector into a fuel-air mixer, said primary amount of said fuel being a majority of the total fuel required for combustion in said plurality of cylinders;

(c) mixing said primary amount of said fuel with air in said fuel-air mixer to form a primary fuel-air mixture;

(d) distributing gaseous fuel from said at least one fuel supply to a plurality of secondary fuel injectors respectively located adjacent said plurality of cylinders;

(e) injecting a secondary amount of said fuel from each of said plurality of secondary fuel injectors into said primary fuel-air mixture to form a final fuel-air mixture for each of said plurality of cylinders, said secondary amount of said fuel being tailored for each respective one of said plurality of cylinders such that the final fuel-air mixture for each of said plurality of cylinders has a specified margin from the lean misfire limit of each respective one of said plurality of cylinders;

(f) respectively passing said final fuel-air mixture to each of said plurality of cylinders for combustion;

(g) monitoring the lean misfire limit for each of said plurality of cylinders during said combustion process; and (h) adjusting said secondary amount of said fuel for each of said plurality of cylinders based on the respective lean misfire limit to maintain said specified margin.

* * * * *

UNITED STATES PATENT AND TRADEMARK OFFICE
CERTIFICATE OF CORRECTION

PATENT NO. : 6,371,092 B1 Page 1 of 1
DATED : April 16, 2002
INVENTOR(S) : Kennon H. Guglielmo, Steven R. King and Michael W. Walser It is certified that error appears in the above-identified patent and that said Letters Patent is hereby corrected as shown below:

Column 1,
Line 28, "dieseli" should be -- diesel --

Column 2,
Line 24, "lo" should be -- (10) --
Line 41, "(i)" should be -- (1) --

Column 4,
Line 24, "lo" should be -- 10 --

Signed and Sealed this

Eighteenth Day of February, 2003

JAMES E. ROGAN
*Director of the United States Patent and Trademark Office*